July 23, 1935.  H. A. BERN  2,009,102
PRESSURE BALANCER
Filed April 21, 1932
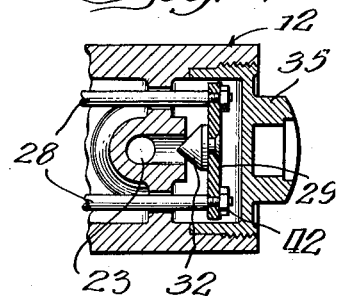
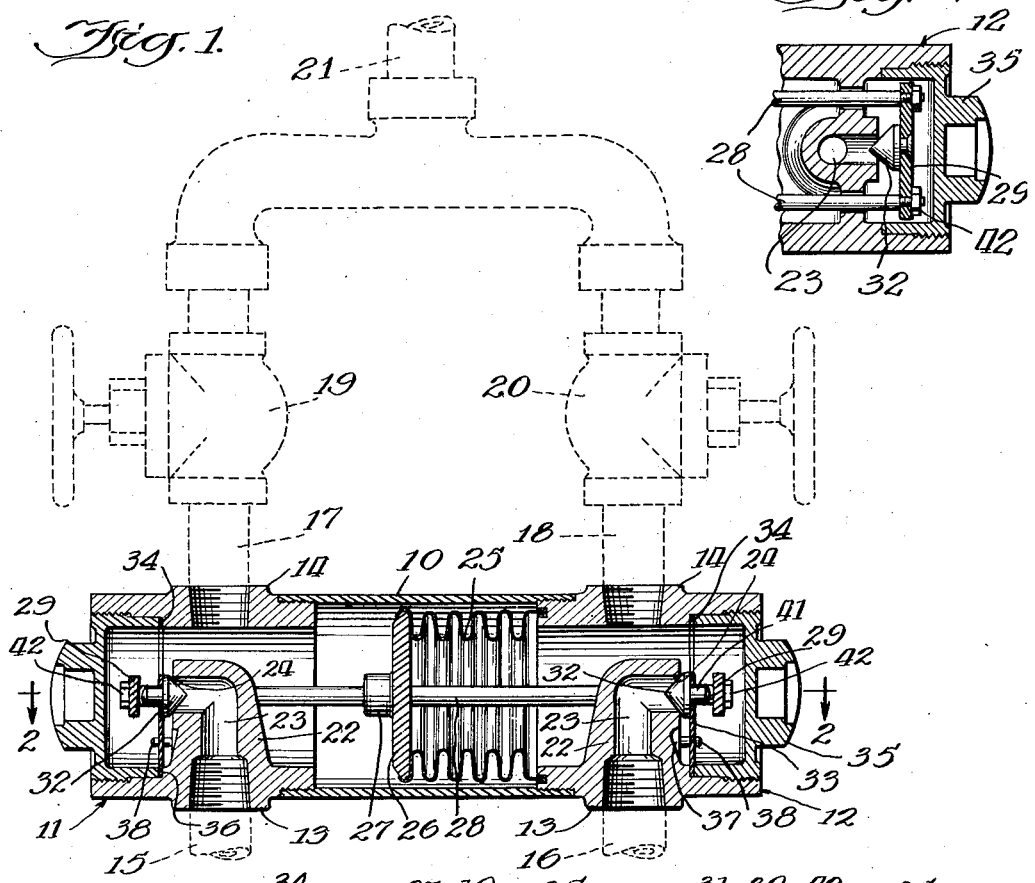
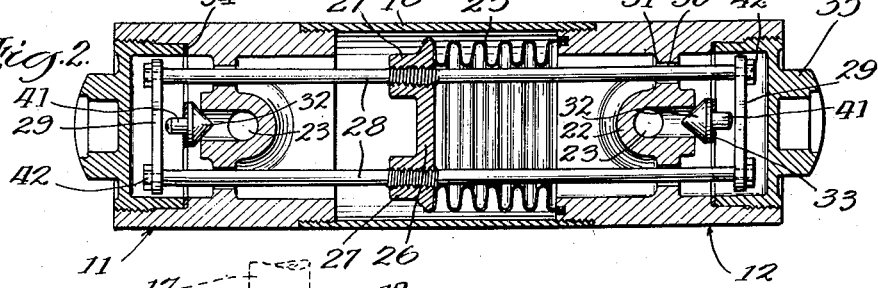
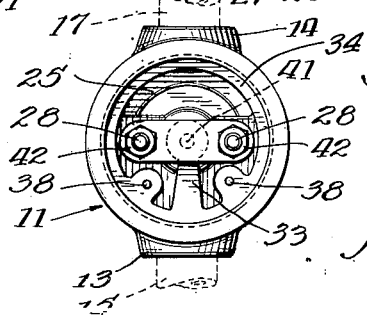
Inventor:
Harry A. Bern
By Williams, Bradbury,
McCabe & Hinkle
Attys.

Patented July 23, 1935

2,009,102

UNITED STATES PATENT OFFICE 2,009,102

PRESSURE BALANCER

Harry A. Bern, Chicago, Ill.

Application April 21, 1932, Serial No. 606,562

20 Claims. (Cl. 277—3)

This invention relates to pressure balancers adapted to control the relative pressures in adjacent pipes conveying water or other fluid.

While the invention is particularly applicable to pipes whose outlets communicate together, for example mixing faucets or the supply pipe of a shower bath or the like to discharge water of controlled temperature, it is nevertheless applicable to other situations in which the discharge through pipes must be correlated, whether or not the discharged fluids be ultimately mixed.

The invention will readily be understood from the following description of a preferred embodiment thereof taken in conjunction with the accompanying drawing, in which Figure 1 is an elevational view partly in section showing a balancer embodying the invention installed for the purpose of controlling a shower bath or the like;

Fig. 2 is a sectional plan view through the balancer taken on the line 2—2 of Fig. 1;

Fig. 3 is an end view of the balancer with the end cap removed, and

Fig. 4 is a sectional detail view showing a modified construction.

Referring to the drawing, the balancer comprises a central body portion 10 which is preferably cylindrical and has end members 11 and 12 rigidly mounted thereon. As shown in the drawing the body 10 may be threaded internally at each end and the end members 11 and 12 may be correspondingly threaded to enable them to be screwed into the body 10. The end members 11 and 12 comprise bosses 13 and 14 which are threaded for reception of supply pipes 15 and 16 and discharge pipes 17 and 18. By way of example, the pipe 15 may be considered the hot water pipe and the pipe 16 the cold water pipe. As shown in Fig. 1, the pipes 17 and 18 may be provided with manually operable regulating valves 19 and 20 respectively and these pipes may unite in a common pipe 21 which in the specific embodiment illustrated may lead upwardly to the spray head of a shower bath.

Each of the end members 11 and 12 is provided interiorly with a pillar 22 provided with a duct 23 which communicates with the pipe 15 or 16, as the case may be. The upper end of the duct 23 is directed outwardly and terminates in a valve seat 24.

The two end members are separated by a flexible fluid-tight element which is responsive to changes of pressure. This element is preferably in the form of a metal bellows 25. One end of the bellows 25 may be secured to one of the end members, for example the end member 12, for example by soldering, and the other end of the bellows 25 may be secured to a plate 26 in any suitable manner, for example by soldering. The bellows 25 extends inwardly from the member 12 into the cylinder 10, as shown in the drawing. The plate 26 carries bosses 27 which are provided with tapped longitudinal openings which are adapted to receive correspondingly threaded portions of longitudinal rods 28. The rods 28 extend beyond the pillars 22 on either side thereof and are shouldered and threaded at their ends so as to receive cross bars 29 which may be secured to the rods by means of nuts 42. The rods 28 and bars 29 provide a rigid rectangular frame. The rods 28 pass freely through openings 30 provided in webs 31 which connect the pillars 22 with the adjacent walls of the end members 11 and 12.

The ducts 23 are adapted to be closed against pressure by means of the valves 32 which are adapted to cooperate with the seats 24. These valves are preferably resiliently mounted so that they normally tend to assume the closed position. Each valve 32 may suitably be mounted on an arm 33 which extends radially inwardly from an annulus 34. The element 33, 34 may suitably be stamped from a thin sheet of springy material, such as phosphor bronze. The opening provided by the annulus is sufficient to permit the rods 28 to pass freely therethrough so that the bars 29 are located on the exterior of the arms 33 and the valves 32. Each element, 33, 34 may suitably be held in position by an end cap 35 which forces said element against a shoulder 36 provided in the end members 11 and 12. Suitable means may be provided to prevent rotation of the element 33, 34 during the application of the cap 35 so as to prevent the arm 33 fouling the rods 28. Thus the pillars 22 may be provided with bosses 37 which carry pins 38 adapted to extend through openings provided in lugs 40 on the element 33, 34.

Each valve 32 carries an outwardly projecting end 41 which is adapted to engage the adjacent bar 29 during operation of the device. It will readily be understood that the spacing of the bars 29 is sufficient to allow the valves 32 to open so as to deliver the maximum amount desired.

In the normal operation of the device, the valves 19 and 20 are opened to deliver a mixed stream of desired temperature through the pipe 21. The flow of fluid through the pipes 15 and 16 opens the valves 32 against the action of the spring arms 33 and forces the outwardly projecting ends 41 into contact with the bars 29. If the pressures in the pipes 15 and 16 remain constant the metal bellows 25 assumes a position of balance. If, for example, the pressure in the cold water pipe 16 goes down the head 26 of the bellows will move to the right as viewed in the drawing, and the hot water valve 32 will be moved towards the seat 24 so as to throttle the hot water supply. Consequently the temperature of the water delivered by the pipe 21 is substantially constant and is determined by the manipulation of the valves 19 and 20 and is substantially independent of fluctuations of pressure in pipes 15 and 16.

The device described possesses many outstanding advantageous features. The employment of the metal bellows 25 provides a device in which all leakage from one side to the other may be effectively prevented. Frequently the hot water pipes are under higher pressure than the cold water pipes and any danger of leakage from the hot water side to the cold water side must be carefully avoided in order to avoid possibility of severe injury from scalding, particularly in the case of shower baths. The bellows 25 possesses substantially no inertia and it positions itself accurately in accordance with the pressure differential between its opposite sides. Furthermore, the bellows is frictionless so that the device may be used with waters which deposit lime and which have corrosive effects resulting in the production of sediment.

The device is easy to manufacture and assemble. It may be noted that the openings 30 through which the rods 28 extend do not require careful placement or careful finish. They may be considerably larger than the rods 28 so as to insure free movement of the frame 28, 29 in response to variation of the pressure differential to which the bellows 25 may be subjected. It will be noted that the only engagement of the valve 32 is by the bar 29 and this bar need only be located so as to make this contact at its center. The bars 29 may be adjusted in position by rotating the rods 28 within the bosses 27.

It will be noted that the valves 32 automatically act as check valves to prevent flow-back of liquid into the pipes 15 and 16. Consequently if the valves 19 and 20 are closed the water spaces of the balancer are filled with trapped liquid so that the bellows 25 no longer responds to variations of pressure in the pipes 15 and 16. It will readily be seen that if the valves 32 are mounted directly on the bars 29, the bellows 25 would move with each variation of pressure and wear of the valves and seats, together with unnecessary noise, would result. The manner of mounting the valve relative to its seat is simple and effective and great accuracy of relative location can be attained in mass production assembly.

In the modification illustrated in Fig. 4 the valves 32 are mounted directly on the bars 29. It will readily be understood that the operation of this embodiment of the invention is substantially the same as that described above with the exception that the valves 32 do not serve as check valves. It will be understood however that check valves may be provided in the supply pipes 15 and 16 if desired.

Although the invention has been disclosed in connection with the specific details of a preferred embodiment thereof, it must be understood that such details are not intended to be limitative of the invention, except in so far as set forth in the accompanying claims.

Having thus described my invention, what I claim as new and desire to secure by Letters Patent of the United States, is:

1. A pressure balancer adapted to control the flow of fluid through two lines, comprising a chamber adapted to receive fluid from each line, a fluid-tight pressure responsive element in said chamber, automatic valves normally tending to close each line and adapted to be opened automatically by the flow of fluid therethrough, and means actuated by the pressure responsive element adapted to limit the opening of each valve in accordance with the position of said element.

2. A pressure balancer adapted to control the flow of fluid through two lines comprising a chamber adapted to permit the streams to pass therethrough, a pressure responsive element separating said streams within said chamber and adapted to occupy a position depending upon the difference of pressure of said streams within the chamber, a frame carried by said element and movable therewith, valves within the chamber adapted to control the entrance of said streams thereinto, resilient means normally tending to move said valves to closed position, said valves being adapted to be opened by the incoming streams and said frame being adapted to limit the opening of said valves in accordance with the position of said element.

3. A pressure balancer comprising a chamber, a metal bellows sealed to said chamber dividing same into two compartments, an inlet into each compartment, an outlet from each compartment, means in each outlet for controlling the discharge of fluid therethrough, independent valves controlling each inlet adapted to close said inlet against pressure, and means actuated by said bellows adapted to limit the opening of said valves.

4. A pressure balancer comprising a chamber, an element responsive to pressure dividing said chamber into two compartments, an inlet into each compartment, an outlet from each compartment, means in each outlet for controlling the discharge of fluid therethrough, a valve controlling each inlet, means tending to close each valve against pressure, and means actuated by said element adapted to limit the opening of said valves.

5. A pressure balancer comprising a chamber, a metal bellows responsive to pressure sealed to said chamber and dividing same into two compartments, an inlet into each compartment, an outlet from each compartment, independent valves controlling said inlets adapted to close against pressure, and means actuated by said bellows adapted to limit the opening of said independent valves.

6. A pressure balancer comprising a chamber, an element responsive to pressure dividing said chamber into two compartments, an inlet into each compartment, an outlet from each compartment, a valve controlling each inlet, and means actuated by said element adapted to limit the opening of said valves, said valves being independent of said element and being adapted to move independently thereof.

7. A pressure balancer comprising an elongated chamber, a resilient element responsive to pressure dividing said chamber into two compartments, an inlet into each compartment, said inlets opening towards the ends of the chamber, a valve controlling each inlet, and means connected to said element extending beyond said valves and adapted to make free contact therewith to limit their opening.

8. A pressure balancer comprising a chamber, an element responsive to pressure dividing said chamber into two compartments, an inlet into each compartment terminating in a valve seat directed towards the adjacent end of the chamber, an outlet from each compartment, a valve normally resting on said valve seat and adapted to be opened by incoming flow, means carried by said element extending beyond said valves and adapted to limit the opening of said valves.

9. A pressure balancer comprising an elongated chamber, a metal bellows therein dividing the chamber into two compartments, an inlet into each compartment, an outlet from each compartment, a valve closing each inlet, resilient means tending to close both of said valves, and means connected to said bellows limiting the opening of said valves.

10. A pressure balancer comprising a chamber, a metal bellows dividing said chamber into two compartments, an inlet in each compartment directed towards the adjacent end of the chamber and away from the bellows, an outlet from each compartment, independent valves closing said inlets against the pressure of the incoming fluid, and means carried by said bellows adapted to cooperate with said independent valves to control the entrance of fluid.

11. A pressure balancer comprising an elongated chamber, a metal bellows therein dividing said chamber into two compartments, an inlet duct in each compartment, a valve in each compartment normally closing said duct, and a frame carried by said bellows and movable therewith adapted to cooperate with said valves.

12. A pressure balancer comprising an elongated chamber consisting of a central portion and two end members, each end member being provided with an inlet duct, a valve adapted to close each duct, a metal bellows mounted on one end member and extending into the central portion, and a frame carried by said bellows adapted to cooperate with said valves.

13. A pressure balancer comprising an elongated chamber consisting of a central portion and two end members, each end member being provided with an inlet duct, a valve adapted to close each duct, a metal bellows mounted on one end member and extending into the central portion, a frame carried by said bellows adapted to cooperate with said valves, means supporting said valves, and a cap at each end adapted to secure said supporting means in position.

14. A pressure balancer comprising a chamber having at each end an inlet and outlet, a metal bellows separating the chamber into two compartments, valves adapted to close said inlets, each valve being located adjacent the end of the chamber, a resilient member supporting said valve, a cap at each end of the chamber adapted to clamp said supporting member in position, and means carried by said bellows adapted to limit the opening of the valves.

15. A pressure balancer comprising a chamber, a metal bellows dividing the chamber into two compartments, an inlet into each compartment, an outlet from each compartment, independent valves controlling said inlets adapted to close against pressure, and means actuated by the bellows adapted to cooperate with said independent valves and control the position thereof.

16. A pressure balancer comprising an elongated chamber, shouldered and threaded at each end, a metal bellows within dividing said chamber into two compartments, an inlet into each compartment, an outlet from each compartment, valves adapted to close said inlets, annular members of resilient material having arms upon which said valves are carried, end caps closing the compartments and clamping the annular members against said shoulders, and a frame carried by said bellows extending beyond said valves adapted to cooperate therewith.

17. A pressure balancer comprising an elongated chamber, an element responsive to pressure dividing said chamber into two compartments, an inlet into each compartment, a valve controlling each inlet adapted to close against pressure, and means connected to said element movable relative to said valves and adapted to limit the opening thereof.

18. A pressure balancer comprising an elongated chamber, a resilient bellows responsive to pressure dividing said chamber into two compartments, an inlet into each compartment, independent valves controlling said inlets and adapted to close against pressure, and means connected to said bellows adapted to control the opening of the independent valves.

19. A pressure balancer comprising a chamber, an imperforate resilient member dividing the chamber into two compartments, an inlet into each compartment, an outlet from each compartment, independent valves closing said inlets, independent means tending to close each valve, said valves being adapted to be controlled by said resilient member.

20. A pressure balancer comprising a chamber, an imperforate resilient member dividing the chamber into two compartments, an inlet into each compartment directed towards the adjacent end of the chamber and away from the resilient member, an outlet from each compartment, independent valves closing said inlets against the pressure of the incoming liquid, and means carried by said resilient member adapted to cooperate with said independent valves to control the entrance of fluid.

HARRY A. BERN.